July 6, 1954

K. C. MELIKIAN ET AL 2,682,984

COFFEE VENDING MACHINE

Filed Feb. 10, 1948

Inventor
KHOREN C. MELIKIAN
LLOYD K. RUDD

By Albert M. Zalkind
Attorney

July 6, 1954     K. C. MELIKIAN ET AL     2,682,984
COFFEE VENDING MACHINE
Filed Feb. 10, 1948                                           6 Sheets-Sheet 3

Inventor
KHOREN C. MELIKIAN
LLOYD K. RUDD

By Albert M. Zalkind
            Attorney July 6, 1954  K. C. MELIKIAN ET AL  2,682,984
COFFEE VENDING MACHINE Filed Feb. 10, 1948  6 Sheets-Sheet 4

Inventor
KHOREN C. MELIKIAN
LLOYD K. RUDD

By Albert M. Zalkind
Attorney

Patented July 6, 1954

2,682,984

UNITED STATES PATENT OFFICE 2,682,984

COFFEE VENDING MACHINE

Khoren C. Melikian and Lloyd K. Rudd, Philadelphia, Pa., assignors to Rudd-Melikian Corporation, a corporation of Pennsylvania Application February 10, 1948, Serial No. 7,484

10 Claims. (Cl. 226—46.6)

This invention relates to coffee vending machines and more particularly to machines for vending coffee responsive to actuation of a coin control mechanism; wherein all the ingredients such as coffee, cream, sugar, etc., are interdependently controlled.

It has heretofore been the practice to vend coffee, cream, and sugar from machines which were inherently unable to provide substantially fresh, full-flavored coffee. For example, some machines provided a mixture of powdered coffee extract and hot water which were mixed subsequent to coin insertion. Such powdered preparations, however, rarely have the same taste as normally prepared coffee. On the other hand, other machines vend normally prepared coffee but are subject to the drawback that the coffee is fully prepared prior to being placed in the machine, and since the keeping qualities of normally prepared coffee are poor, various adulterating preservatives must be added, which affect taste and purity of the product. Further, the fully prepared coffee must be maintained at a high temperature in the machine so as to be readily available for vending in a palatable condition, which sustained heating further hastens the deterioration process. Even at room temperature fully prepared coffee deteriorates rapidly owing to the large quantity of water compared to the amount of coffee ingredient therein, a phenomenon which is not fully understood but is well known.

Acording to our present invention we eliminate the drawbacks of prior art devices by providing a machine which vends substantially fresh coffee by virtue of mixing a small amount of highly liquid concentrated coffee extract, which is kept in a refrigerated condition, with hot water which is maintained in a heated tank or reservoir. In this manner, each cup of coffee is substantially freshly mixed and since the keeping qualities of a refrigerated liquid coffee extract are far superior to that of normally prepared coffee, our machine is capable of long pediods of use without replenishment or servicing.

We achieve our result by combining, within the same housing, a refrigeration compartment which keeps not only the coffee extract in a chilled condition, but also a large quantity of liquid cream. Also within the housing are a hot water tank having automatic pressure and temperature regulations, and a reservoir for liquid sugar, i. e., simple syrup. Further, an automatic cup dispensing mechanism having a novel mounting, and a spoon dispensing mechanism are incorporated into our device, including a cup chute and a spoon actuating means involving improved structure. In addition, a sterilizing lamp is disposed adjacent the cup chute above a drain platform on which the cups are adapted to rest during filling, which drain platform is constructed in such a manner as to be quickly and thoroughly cleaned.

Our machine utilizes a coin control mechanism having a novel type of scavenger, and employs an electric control system which effects a cycle of operation responsive to insertion of a coin in the coin mechanism. The system comprises a plurality of rotary cams which operate microswitches for actuating a plurality of solenoid valves permitting a predetermined quantity flow of coffee extract, hot water, cream and simple syrup, during the course of the cycle. A pair of control buttons is incorporated into our circuit in such a manner that coffee with or without sugar and with or without cream may be obtained at the option of the vendee. In conjunction with these control buttons, other controls are utilized whereby the quantities of cream and sugar dispensed may be predetermined by the vendee within certain limits.

Various objects and features of our invention being apparent from the foregoing discussion, other objects and features will be apparent from the detailed description which now follows, taken in conjunction with the drawings in which.

General description of the machine

Figure 1:
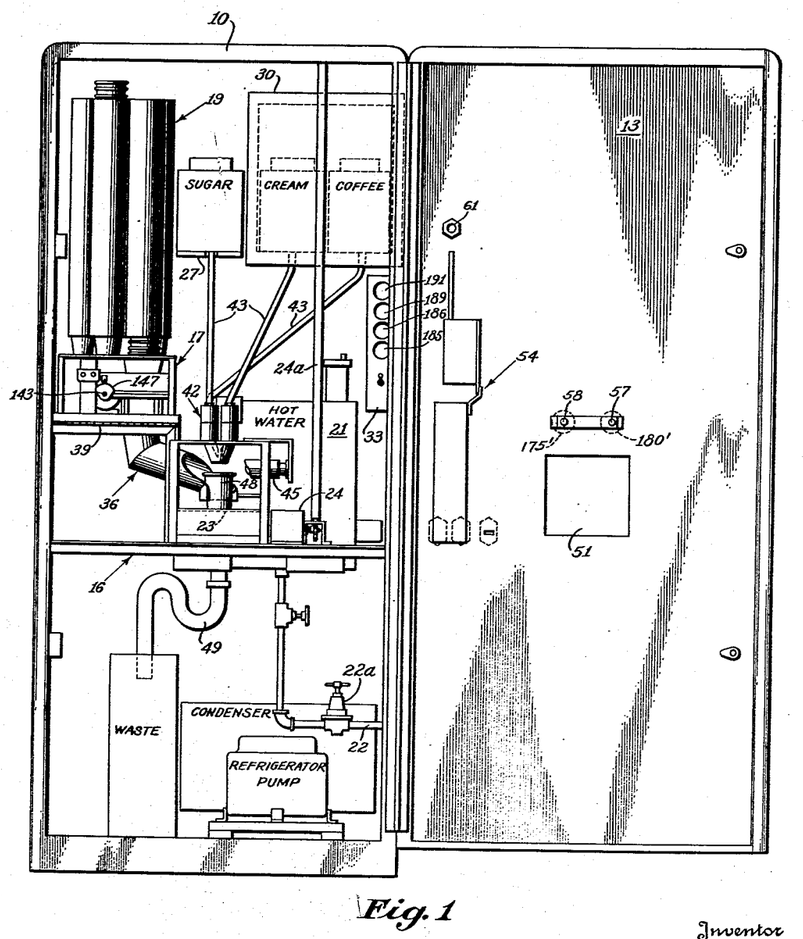
Fig. 1 is an elevation of our assembled machine, shown assembled within the housing.

With reference to Fig. 1, our machine comprises a cabinet 10 of sufficient volume to house all elements therein, and having a door 13 hinged thereto, the door being shown in maximum opened condition to clearly expose the several parts of the machine. For simplicity no wiring is shown in this view.

The cabinet is constructed with a fabricated bracket assembly, generally indicated at 16, arranged to support a cup magazine 19, an electrically heated hot water tank 21, a drain rack 23, a spoon dispensing mechanism 24 and spoon magazine 24a. As will be clear from Fig. 1, containers of certain of the commodities to be dispensed, viz., sugar, cream and coffee, are suitably supported above bracket 16 so as to take advantage of gravity flow. The sugar container, which holds a quantity of simple syrup may be disposed on a shelf 27 welded (not shown) to the rear wall of the cabinet. The liquid cream and liquid coffee extract containers are housed in a refrigerator 30 which may be supported by suitable fastening (not shown) to the side wall of cabinet 10.

A junction box 33 into which may be plugged electric cables from certain control elements on door 13 is likewise supported by being fastened in any suitable manner to the side wall of cabinet 10.

Bracket 16 also supports a cup chute 36 which is disposed below the cup outlet of magazine 19 but is not integrally attached thereto, magazine 19 being secured by a hinge 39 to bracket 16.

A cluster of solenoid operated valves 42 is secured above the opening in the cup chute and are connected by tubes 43 to respective commodity containers. An ultraviolet sterilizing lamp 45 is disposed so as to direct its rays into the chute, and towards the valve outlets as well as to the rim of the cup 48.

It should be noted that the hot water tank is disposed quite close to valve cluster 42 so that as little heat as possible will be lost in the tubing connection (not shown) between the tank and its respective solenoid valve. The water in tank 21 is under city pressure through supply pipe 22, the pressure being regulated through a pressure regulator valve 22a. Thus feed from tank 21 does not depend on gravity.

The lower portion of the cabinet houses a waste tank into which drippings from drain rack 23 are carried through an S trap drain pipe 49; likewise the pump and condenser of the refrigerator are housed in the lower portion of the cabinet. It will be understood that suitable refrigerant conducting pipes (not shown) are connected from the refrigerating pump unit to the refrigerator cabinet 30.

The door 13 is provided with a cut out area 51 through which access is had for cup removal when the door is closed. Carried by the door are a coin insertion chute and scavenging mechanism 54, push button control means 57, 58, manually rotatable knobs 59, 60 (Figs. 1a, 1b), and a "sold out" signal lamp 61.

The cup chute and cup receiving assembly

Figures 2, 3, 4, 5, 6, 7:
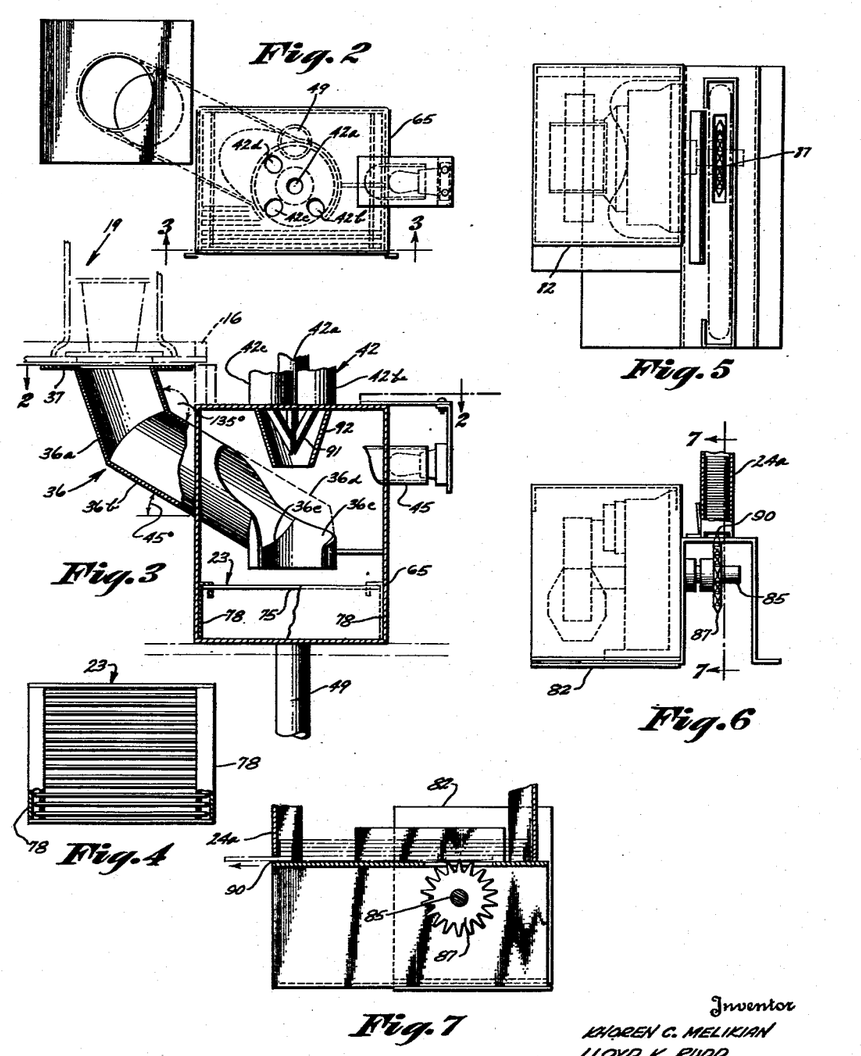
Fig. 2 is a sectional plan view showing the arrangement of the cup chute, the drain rack, the commodity outlets and the sterilizing lamp, the section being taken generally through 2—2 of Fig. 3.
Fig. 3 is a section through 3—3 of Fig. 2.
Fig. 4 is a plan view of the drain rack.
Fig. 5 is a plan view of the spoon dispensing mechanism.
Fig. 6 is a front elevation thereof.
Fig. 7 is a section through 7—7 of Fig. 6.

With reference to Figs. 2 and 3, this portion of our machine comprises a housing 65, shown in section, supported by bracket 16 shown in phantom. Passing through the side of the housing is the chute 36 which is formed in two sections, an upper section 36a and a lower section 36b. Upper section 36a terminates in a plate 37 permanently fixed to bracket 16 and disposed below the outlet of the cup dispenser. The chute is integral with bracket 16 and not movable relative thereto. The cup dispensing magazine, however, being hinged at 39 (Fig. 1) may be tilted forward bodily as will hereafter be described. The angle between the two sections 36a and b is approximately 135° and the angle made by the lower section 36b with reference to a horizontal plane is approximately 45°. The lower end of the section 36b is skeletonized, at 36c there being a large portion of the material, as indicated by the dotted line, 36d, removed. This construction permits the cup to descend, bottom first, at the proper rate and to fall into the partial ring formed by 36c whereby it is righted in readiness for filling. It should be noted that the cut-out portion as indicated by 36d extends substantially along the upper surface of section 36b so that there is clearance for a cup to commence being righted of its own weight after the lower end thereof passes the edge 36c. However, upon the lower end of the cup striking the interior surface on the right half of ring 36c it is caused to drop vertically the remaining short distance so as to come to rest on rack 23. Thus, the basic principle involved in this construction is the provision of a slantedly disposed truncated tube, the truncated portion being disposed to provide clearance for rotation of the cup as it passes an edge at the lowermost portion of the tube, whilst a buffer wall formed preferably in ring shape is disposed so as to arrest all motion of the cup except in a vertical direction.

The drain rack

With reference to Figs. 3 and 4, the drain rack comprises a plurality of rod-like rollers 75, having ends rotatably carried in opposed side members 78. The construction is such that the rollers are readily revolved upon being wiped with a cloth or sponge and accordingly may be quickly and thoroughly cleaned. It is contemplated that the rollers will be made of stainless steel or other non-corrosive material. Thus an unsightly and unsanitary condition of the drain rack is easily avoided.

The spoon feeding mechanism

As shown in Figs. 5, 6 and 7, the spoon feeding mechanism 24 comprises a motor and gear box indicated in dotted outline within a housing 82 from which extends a rotary shaft 85 which carries a toothed wheel 87 which is rotated during the cycle of operation. Magazine 24a houses a column of spoons directly over wheel 87, the lowermost spoon being in engagement with the top teeth of the wheel. Since the spoons are in reality flat pieces of wood somewhat similar in shape to tongue-depressors, it will be understood that rotation of the wheel 87 forces the lowermost spoon outwardly through a slot 90 at the base of the magazine. Thus as the lowermost spoon is ejected through slot 90, the remaining spoons drop en masse of their own weight, each spoon in turn being ejected, upon arrival at the lowermost position, during a cycle of operation.

The solenoid valves

The valve cluster 42 comprises a plurality of valves 42a, b, c, and d, as indicated by all the outlets therefore shown in Fig. 2. All valves are identical as to structure. It will be noted that valve 42a, the hot water valve, is centrally located, the other three valves being disposed thereabout, and their outlets comprising truncated tubes 91, opening centrally of the cluster formed thereby, there being a shield 92 encompassing the outlets, Fig. 3.

Figures 8, 8A, 12, 12A, 12B:
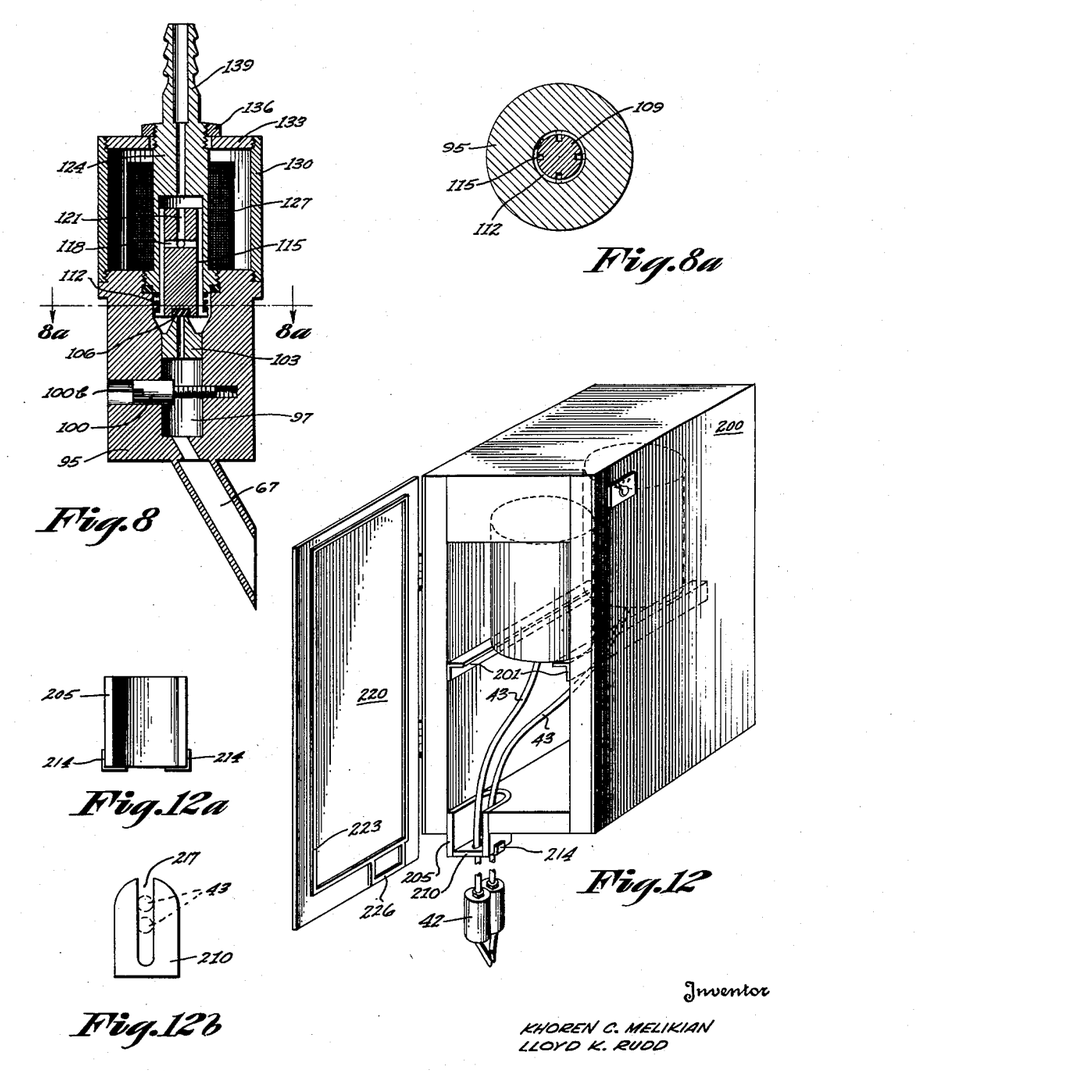
Fig. 8 is a sectional view of one of the four commodity valves.
Fig. 8a is a section through 8a—8a of Fig. 8.
Fig. 12 is a perspective view of a modified refrigerating cabinet.
Fig. 12a shows a plan view of an element of Fig. 12.
Fig. 12b shows a plan view of another element of Fig. 12.

As shown in Figs. 8 and 8a, a body member 95 is provided with a bore 97 terminating in an outlet tube 91. A flow regulating member 100 is provided, threadedly engaged in the body across bore 97. It will be appreciated that member 100 may be adjusted by inserting a screw in kerf 100a. The upper portion of bore 97 is constricted by a valve seat 103, which is normally closed by a valve head 106. Valve head 106 is carried in a magnetically operated plunger 109 which is biased to downward position by a spring 112. Plunger 109 is provided with longitudinal grooves 115, cross channels 118, and a central bore 121, in such a manner that all such passages are interconnected. Plunger 109 is slidably arranged in a non-magnetic shield 124 which is threaded into body 95 and around which shield is disposed a solenoid 127 which in turn is encompassed by a housing member 130 threadedly engaging body 95 and being closed at the top by washer 133 and nut 136.

Member 124 terminates in an undulated inlet extension 139 suitable for gripping engagement with the end of a tube of resilient material from a commodity container.

Thus when solenoid 127 is energized, plunger 109 is raised against the bias of spring 112 to permit flow through the valve.

It should be noted that owing to the naturally different viscosities of the commodities and to differing pressures thereon, depending on heights of liquid in the containers, the regulators 100 are required to compensate therefore, so that during the course of a cycle a predetermined and accurate amount of flow of each commodity is achieved.

The cup magazine and related parts

Figures 1A, 1B, 9, 10:
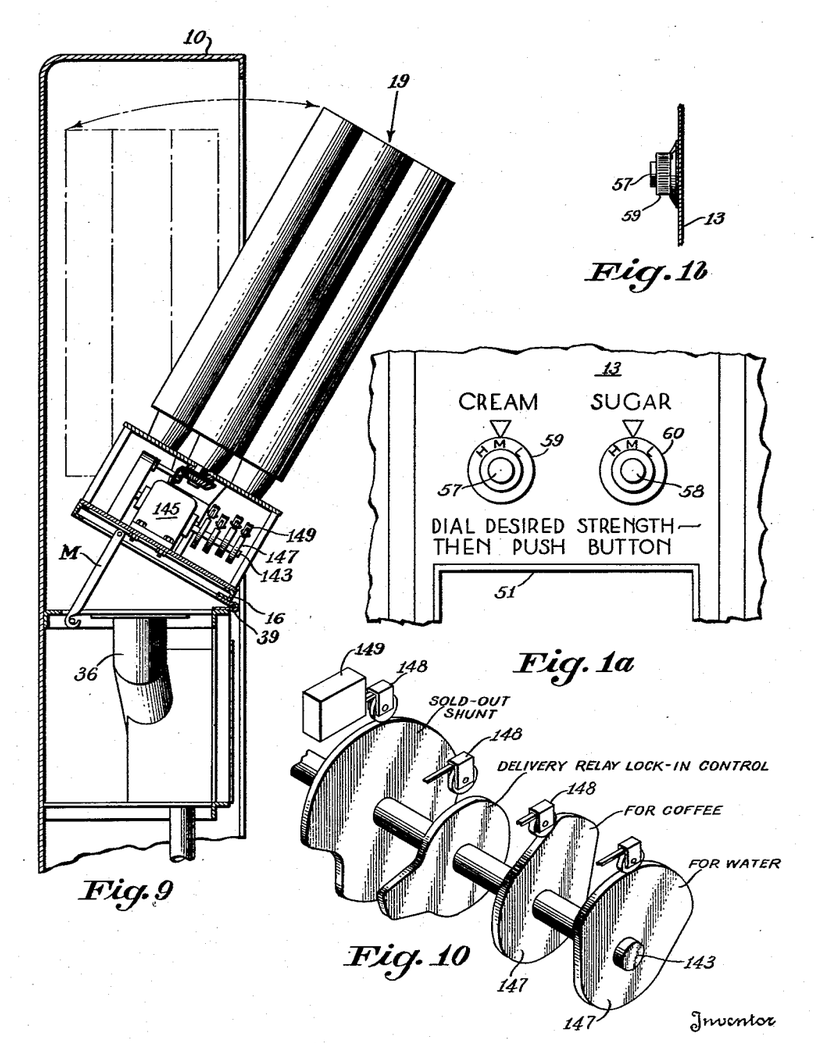
Fig. 1a is a view of a portion of the front panel of our machine showing details of the control elements.
Fig. 1b is a side view of one of the control elements.
Fig. 9 is an elevation showing the cup turret in tilted position.
Fig. 10 is a perspective of the cam and switch assembly, shown mounted on the shaft of the cup dispensing motor.

We prefer to employ a commercially obtainable cup dispensing mechanism and make no claim to any invention thereof except as noted hereinafter. Our cup magazine, indicated generally at 19 (Fig. 9) is of the known type which comprises a plurality of tubular holders, each of which holds a quantity of nested cups and which holders are mounted to form a rotary turret, the arrangement being such that as each holder is depleted the turret rotates a portion of a turn to bring a fresh holder into position for dispensing its cups through chute 36. Such mechanisms are actuated by electric motors and we take advantage of this construction to utilize the motor thereof for rotating the cams which form the means for timing the flow cycle of the several commodities. As shown in Fig. 9, we fit an extended shaft 143 to the motor 145, through suitable reduction gearing (not shown), which motor is regularly installed in the device as purchased, and we affix a plurality of cams 147 thereon, Fig. 10. The several cams are made of any suitable stiff material and actuate the movable arms 148 of a plurality of respective micro-switches 149.

The particular feature of our invention to be observed in connection with Fig. 9 is the pivoted position of the entire magazine 19 about the hinge 39, to the extent permitted by a catch member M, so that the tops of the cup holders are exposed to view. It will be understood that suitable flexible cables are connected from motor 145 and micro-switches 149 so as to permit the tilting forward of the holders. With this construction we are enabled to conveniently fill the cup magazine with stacks of nested cups. This is in contradistinction to prior construction wherein access to the top of the magazine had to be provided by using an unduly high cabinet or by providing a removable cover therefor or by translating the magazine out of the cabinet.

The cup magazine is equipped with a switch 150 (Figs. 11, 11a) controlling a motor designated which causes automatic rotation of the turret so as to bring a fresh column of cups over chute 36 each time a column is exhausted, and an additional switch 151 (Fig. 11) which automatically energizes the "sold out" lamp 61 and de-energizes the coin return solenoid when all cups in the magazine are exhausted. The electrical functions of the latter switch will be hereinafter discussed under the topic of circuit operation. A further switch 152, which is operated by a cam mounted on shaft 143, and which controls current to motor 145 for dispensing individual cups is provided as part of the mechanism.

The circuit

Figure 11:
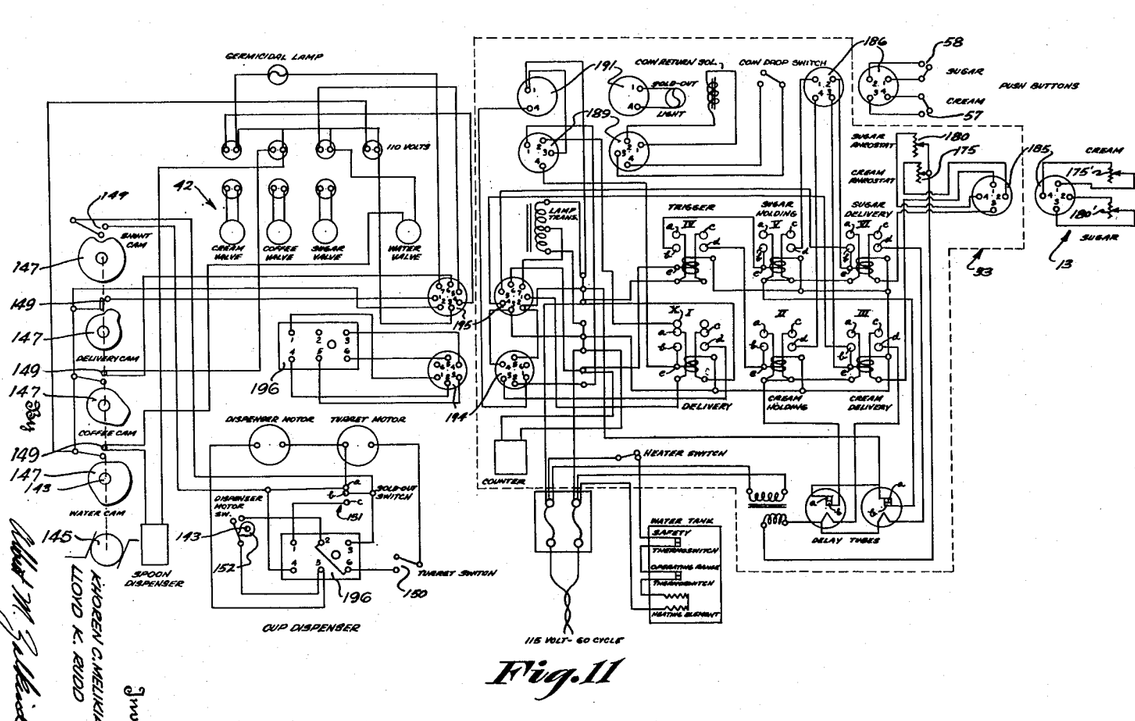
Fig. 11 is a wiring diagram of the electrical circuit utilized in our machine.

As heretofore indicated, the commodities dispensed by our machine are controlled in quantity by solenoid valves energized through micro-switches actuated by rotating cams. In Fig. 11 there is shown symbolically a plurality of commodity valves labelled: Cream, Coffee, Sugar, Water, and a plurality of cams labelled: Water, Coffee, Delivery, Shunt. These elements comprise the valve cluster 42 and cams 147, as shown generally in Fig. 1.

The circuit also comprises a plurality of relays designated as: Delivery Relay, Trigger Relay, Sugar Holding Relay, Sugar Delivery Relay, Cream Holding Relay, Cream Delivery Relay, all as found in Fig. 11. These relays, including a lamp transformer for the germicidal lamp, a pair of conventional thermal delay relays, a filament heating transformer for same, a counter mechanism, and a pair of cream and sugar volume predetermining resistors 175 and 180, respectively, all as correspondingly labelled on Fig. 11, are contained within the junction box 33, as indicated in dotted lines. On the door 13 of the cabinet, also indicated in dotted lines on Fig. 11, are disposed the cream and sugar push buttons 57, 58 and a pair of variable resistances 175′, 180′, operable by knobs 59, 60 (Fig. 1a), which resistances connect in series with resistances 175 and 180, respectively, when the male and female members of conventional interconnectors 185 are joined. Numerals on the male and female members are shown to designate specific connections. In a similar manner the sugar and cream push buttons are connected to the remainder of the circuit in the junction box by interconnectors 186; and interconnectors 189 connect the coin drop switch and coin acceptance solenoid to the circuit, while interconnector 191 performs the same function for the "sold out" lamp.

In like manner interconnector members 194 and 195 are utilized to make connections from the cams, valves and cup motors to the circuits in the junction box 33, while interconnectors 196 join the cup dispenser circuit with the cam and relay circuits.

The elements as shown in Fig. 11 are in normal non-operating position. Under such conditions (Fig. 11a) the coin return solenoid is energized through contacts x—a of relay I, and the "sold out" lamp is dark since the lamp is normally controlled by contacts b—c of switch 151, which contacts are not engaged. The cams are in the relative positions shown, the delivery cam switch being closed and all other cam switches being open, including the cup delivery switch 152 which is in series with the cup dispensing motor.

Figure 11A:
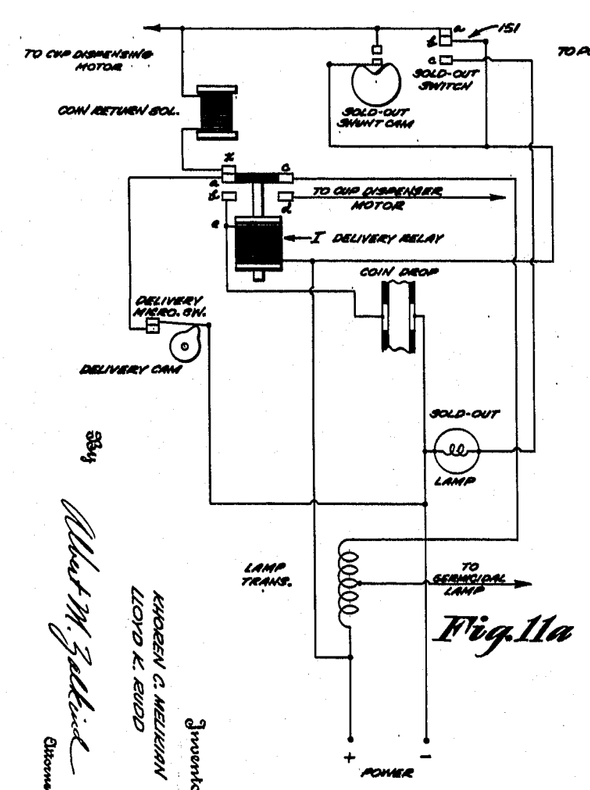
Fig. 11a is an enlarged and simplified diagram of a portion of the circuit.

The specific operation of the circuit is as follows:

1. When a coin is dropped in the coin drop chute, the coin drop switch is momentarily triggered which sends an impulse to the solenoid of delivery relay I at point e (Fig. 11a). Relay I is thus energized whence:

(a) Contacts x and a open causing de-energization of the coin return solenoid, thereby blocking any further coin acceptance until a delivery cycle is completed.

(b) Contacts a and b close, thereupon feeding an impulse to point e of that relay causing it to lock in energized position. The power to point a is fed from the delivery cam which is normally closed as shown in Figs. 11 and 11a.

(c) Contacts c and d close which shunts cup delivery switch 152 thereupon energizing the dispensing motor of the cup magazine.

(d) The cup delivery switch cam and all the other cams on the shaft 143 commence rotating.

(e) After approximately 20° rotation the cup delivery switch is closed thus feeding current to the cup dispenser motor independently of contacts c—d of relay I.

2. Approximately one second after starting of rotation of shaft 143 a cup drops into position on shelf 23 (Fig. 1) through the chute 36, all as heretofore described. At this time the following functions occur:

(a) The water dispensing cam actuates its respective micro-switch to actuate the water solenoid valve thus sending a predetermined amount of hot water into the cup.

(b) This same micro-switch energizes the spoon dispensing motor to eject a wooden spoon.

(c) The coffee micro-switch is closed by its respective cam whereby the coffee solenoid valve is opened to dispense a predetermined quantity of coffee.

(d) The counter mechanism, which is actuated by the coffee dispensing micro-switch, registers a sale.

Figure 11B:
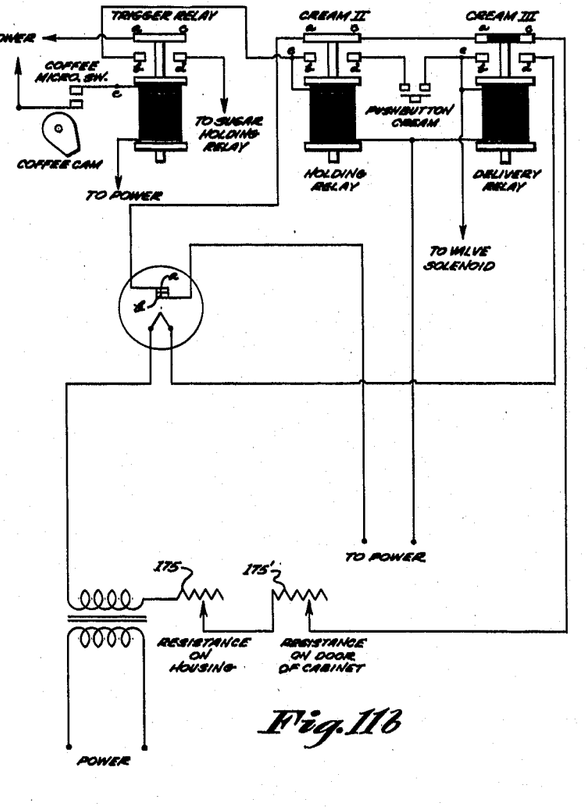
Fig. 11b is an enlarged and simplified diagram of another portion of the circuit.

(e) Trigger relay IV is energized upon closing of the coffee micro-switch, current to point e of that relay energizing the solenoid thereof and causing contacts a—b and c—d to close which sends an electrical impulse to point e of the sugar holding relay V and to point e of the cream holding relay II. Fig. 11b shows a portion of the circuit in a somewhat simplified manner, for cream control.

(f) The sugar holding relay V and the cream holding relay II lock in the energized position because of power fed through their respective contacts a—b. This power is fed through the respective thermal delay relays, the contact members a—b therein being engaged at this time.

(g) Points c and d of the sugar holding relay V and of the cream holding relay II are engaged thereby feeding a voltage to the sugar and cream push buttons 57, 58 (Fig. 11b), whereby they are now rendered operative, such voltage being fed through the engaged contacts a—b of the respective thermal delay relays.

Accordingly, either or both buttons may be pressed to dispense sugar or cream at any time after the coffee micro-switch is closed, as will be evident from consideration of the foregoing. Pressing one of the buttons energizes a respective relay; for example, the cream delivery relay III (Fig. 14b), whereupon contacts c and d engage to pass current from the heater transformer to the thermal relay filament, while contacts a—b pass current to lock relay III in and also pass current to the cream valve solenoid. After the filament has attained sufficient heat, as determined in point of time by series resistances 175 and 175', the contacts a—b in the thermal relay separate, breaking the holding circuit in relay II. The holding current of relay III is accordingly broken and the cream valve solenoid thus de-energized, shutting off flow. The period of flow is of the order of two seconds, depending on the setting of the variable resistances and the quantity of cream delivered is thus determined by resistance 175' within the limits determined by resistance 175.

The sugar control relays V and VI are operable in precisely the same manner, as described for the cream control, by the sugar push button 58, through the respective thermal delay relay, quantity being determined by variable resistances 180 and 180'.

Rotation of shaft 143 continues until after approximately 340° displacement, the delivery cam momentarily opens and closes its respective micro-switch which has the effect of interrupting the current to point a of relay I, whereupon this relay assumes the normal position shown, i. e., it becomes de-energized. The trigger relay is de-energized when the coffee cam completes its effective cycle, whereupon the coffee micro-switch is opened. After one revolution of shaft 143 the cup delivery switch 152 is opened by its respective cam, thereby de-energizing the cup dispensing motor.

After sugar or cream, or both, are dispensed, and the relays are restored to the normal positions, the system is ready for another cycle, the contacts a—b in the thermal delay relays being once more engaged.

Switch 151, at the time that the very last cup is being dispensed, is operative to open contacts a—b and close contacts b—c, for de-energizing the coin acceptance solenoid and energizing the "sold out" lamp, respectively, there being mechanism (not shown) provided as part of the cup magazine for actuating the switch. However, the current for the cup dispensing and turret motors also passes through contacts a—b of this switch. Accordingly, if switch 151 be operated after the last cup has been dispensed, but prior to completion of the liquid dispensing cycle, rotation of all cams would cease prior to closing of the valves and water and coffee would continue flowing through the held open valves. This difficulty is eliminated by the "shunt" cam which holds its respective micro-switch closed, thus shunting contacts a—b of switch 151 until the cycle is completed, thereby ensuring full rotation of the cup dispensing motor until the cams have returned to starting position, whereat all valves are closed.

*The modified refrigerator chamber*

In Fig. 12 is shown a refrigerator chamber 200 having angle irons 201 therein for supporting containers of cream and coffee. Tubes 43 connect the containers to respective valves 42, as heretofore described.

The novel construction herein consists in providing a plastic member 205 of U shape in the floor of cabinet 200 through which tubes 43 pass.

The bottom of member 205 is closed by another plastic member 210 (Fig. 12b), which is held therein by brackets 214 (Fig. 12a). Closure member 210 has a slot 217 therein which slot is made sufficiently large to permit tubes 43 to pass therethrough with enough surrounding open area as to ensure a downward flow of cold air from cabinet 200. Such construction maintains the exposed portions of the tubes and the valves 42 at a low temperature to prevent spoilage of such quantities of cream and coffee as normally remain therein between dispensing cycles.

Cabinet 200 is provided with a door 220 having a gasket seal 223, of rubber or the like, and a special seal 226 is provided having portions arranged to engage the end of members 210 and the lower portions of the member 205 so as to prevent leakage therearound.

We have found that the use of plastic, such as methacrylate or the like, for members 205 and 210 substantially eliminates the formation of condensation from the surrounding atmosphere on these members, which condensation would cause a dripping of moisture onto the valves and into the cup during dispensing, an obviously undesirable condition.

It will be obvious to those skilled in the art that member 205 could be made sufficiently large to house the coffee and cream valves, if desired. In such case slot 217 need not be any larger than necessary to permit protruding of the valve outlets. In fact, two holes, one for each outlet, could be substituted for the elongated slot.

Having thus described our invention, we are aware that many modifications thereof are possible of the several features disclosed; accordingly, we do not consider ourselves bound by the specific structure described except as set forth in the appended claims.

We claim:

1. An electrical system for a coin operated coffee dispensing machine comprising a pair of cams and respective switches actuatable thereby, coffee and hot water valve solenoids operated by said switches, a motor for actuating said cams, a delivery relay, means for initially and momentarily energizing said delivery relay, means for locking in said delivery relay for a predetermined period, said motor being energized in response to energization of said delivery relay, a trigger relay, means for energizing said trigger relay in response to closing of one of said switches at a time determined by the shape of the respective cam, a holding relay, means for energizing said holding relay in response to energization of said trigger relay, means for locking in said holding relay, a commodity relay, means comprising a push button for momentarily energizing said commodity relay, said commodity relay being locked in by current passing through engaged contacts of said holding relay and means comprising a timing element for de-energizing said holding relay after elapse of a predetermined period whereby said commodity relay is de-energized.

2. In a device as set forth in claim 1, wherein said timing element comprises a thermal delay relay having a heater filament and having normally engaged contacts through which passes holding current for the solenoid of said holding relay independently of said trigger relay, and release means whereby said normally engaged contacts are disengaged after a predetermined period subsequent to actuation of said push button.

3. In a device as set forth in claim 2, wherein said release means comprises a pair of contacts engageable upon energization of said commodity relay to pass current to the heater filament of said thermal delay relay for disengaging the contacts thereof.

4. An electrical control system for a dispensing machine comprising a solenoid valve, a normally open switch for energizing said valve, a cam for closing said switch, electric motor means for actuating said cam, a delivery relay, means for momentarily energizing said relay, a normally closed switch through which passes a holding current to said relay when said relay is energized, a cam for momentarily opening said latter switch to de-energize said relay, said latter cam being actuated by said electric motor means, a normally open switch and means for closing said switch prior to de-energization of said delivery relay and opening said switch subsequent to de-energization of said delivery relay, and means whereby said last named switch serves to control the extent of actuation of said cams so as to insure the motion thereof to the end of a complete cycle.

5. In a system as set forth in claim 4, wherein the means for closing said normally open switch comprises a cam actuated by said motor means, current to said motor means passing through said switch during a vending cycle.

6. In a machine for vending coffee, a control system comprising a solenoid valve for controlling coffee extract, a switch controlling said valve, a cam controlling said switch, a delivery relay, an electric motor for actuating said cam, said motor being energized upon energization of said delivery relay, means for momentarily energizing said delivery relay and means for maintaining said delivery relay energized for a predetermined time, said means including normally closed switch elements and an additional cam actuated by said motor for separating said elements at the end of a cycle, to stop said motor, wherein said solenoid valve is energized for a predetermined portion of said cycle.

7. In a machine as set forth in claim 6, including a commodity holding relay and a commodity delivery relay, said holding relay being operative when energized to render said commodity delivery relay operable and to maintain it in energized condition when said commodity delivery relay is momentarily energized, means for momentarily energizing said commodity delivery relay, said holding relay being initially energized responsive to closing of said switch controlling said solenoid valve.

8. In a machine as set forth in claim 7, including a trigger relay intermediate said valve solenoid control switch and said holding relay and serving to energize said holding relay when said control switch is closed.

9. In a machine as set forth in claim 7, wherein the means for momentarily energizing said commodity relay comprises a push button, including a current timing device rendered operative in response to actuation of said push button, wherein when a current passes through said timing device said holding relay is de-energized after a predetermined interval, thereby de-energizing said commodity relay, including a solenoid valve controlled by said commodity relay for dispensing a commodity during said time interval.

10. A vending machine comprising, in combination, a cup dispensing mechanism, a cup dispensing motor for actuating said cup dispensing mechanism, a plurality of switches, an electric circuit controlled by said switches, means controlled by said circuit for vending liquid products, and cams actuated by said cup dispensing motor for actuating said switches.

References Cited in the file of this patent

UNITED STATES PATENTS

| Number | Name | Date |
|---|---|---|
| 1,138,588 | Augensen | May 4, 1915 |
| 1,183,557 | Hall | May 16, 1916 |
| 1,466,492 | Stiriss | Aug. 28, 1923 |
| 1,939,280 | Schietzel | Dec. 12, 1933 |
| 2,000,556 | Brady | May 7, 1935 |
| 2,223,146 | Yeomans | Nov. 26, 1940 |
| 2,253,482 | Forsthoefel et al. | Aug. 19, 1941 |
| 2,279,243 | Parsons | Apr. 7, 1942 |
| 2,284,880 | Nicholson | June 2, 1942 |
| 2,285,833 | Platt | June 9, 1942 |
| 2,308,532 | Mills | Jan. 19, 1943 |
| 2,370,848 | Doggett | Mar. 6, 1945 |
| 2,376,403 | Thompson et al. | May 22, 1945 |
| 2,384,778 | Whitman | Sept. 11, 1945 |
| 2,433,977 | Bently | Jan. 6, 1948 |
| 2,462,019 | Bowman | Feb. 15, 1949 |
| 2,497,718 | Earley et al. | Feb. 14, 1950 |
| 2,552,856 | Knapp | May 15, 1951 |
| 2,558,522 | Knapp | June 26, 1951 |